United States Patent [19]
Hwang et al.

[11] Patent Number: 5,341,417
[45] Date of Patent: Aug. 23, 1994

[54] INTEGRATED PCM-CODEC CIRCUIT WITH TELEMETERING NOISE ELIMINATION

[75] Inventors: In-Hwan Hwang; Hye-Kyoung Lee, both of Inchon-city; Yi-Sung Bae, Seoul; Bang-Won Lee, Kwangmyong-city, all of Rep. of Korea

[73] Assignee: SamSung Electronics Co., Ltd., Suwon, Rep. of Korea

[21] Appl. No.: 901,757

[22] Filed: Jun. 22, 1992

[30] Foreign Application Priority Data
Oct. 2, 1991 [KR] Rep. of Korea .................... 91-17281

[51] Int. Cl.$^5$ ..................... H04M 3/18; H04M 11/00; H04B 1/10; H04B 14/04
[52] U.S. Cl. ..................... 379/399; 379/106; 379/146; 379/377; 375/7; 375/25; 375/34
[58] Field of Search .................... 375/25, 7, 34, 26, 28, 375/29, 30; 379/145, 146, 106, 154, 339, 345, 377, 399, 406; 370/110.1

[56] References Cited
U.S. PATENT DOCUMENTS

| | | | |
|---|---|---|---|
| 4,007,334 | 2/1977 | McDonald | 370/110.1 |
| 4,591,827 | 5/1986 | Nishita et al. | 379/339 |
| 4,677,645 | 6/1987 | Kaniwa et al. | 375/25 |
| 4,796,296 | 1/1989 | Amada et al. | 379/345 |
| 5,055,843 | 10/1991 | Ferguson, Jr. et al. | 375/28 |
| 5,128,963 | 7/1992 | Akagiri | 375/25 |

Primary Examiner—James L. Dwyer
Assistant Examiner—Scott L. Weaver
Attorney, Agent, or Firm—Robert E. Bushnell

[57] ABSTRACT

An integrated PCM-CODEC circuit including a plurality of PCM subscriber lines consisting of a SLIC for interfacing a telephone line with a switching system, an impedance conformer and a PCM-CODEC, a common bus for transferring a telephone signal into or from a subscriber according to the time division rule for the timing of telephone line use, a telemetering signal source and a (synchronization signal for controlling portion of the telephone call called by the n'th subscriber. The PCM-CODEC circuit includes a buffer, a signal selector, an applied gain controller, an anti-aliasing filter, a telemetering signal filter, a BPF, a coder, a decoder, a LPF, a received-gain controller, a smoothing filter, an operational amplifier and a telemetering gate.

25 Claims, 3 Drawing Sheets

INTEGRATED PCM-CODEC CIRCUIT WITH TELEMETERING NOISE ELIMINATION

FIELD OF THE INVENTION

The present invention relates to an electronic switching system, and more particularly to an integrated PCM-CODEC (pulse-code modulation coder and decoder) circuit employing a filter arrangement capable of removing the telemetering sound at a transmitting terminal caused by metering while communicating on a public telephone.

BACKGROUND OF THE INVENTION

Figure 1:
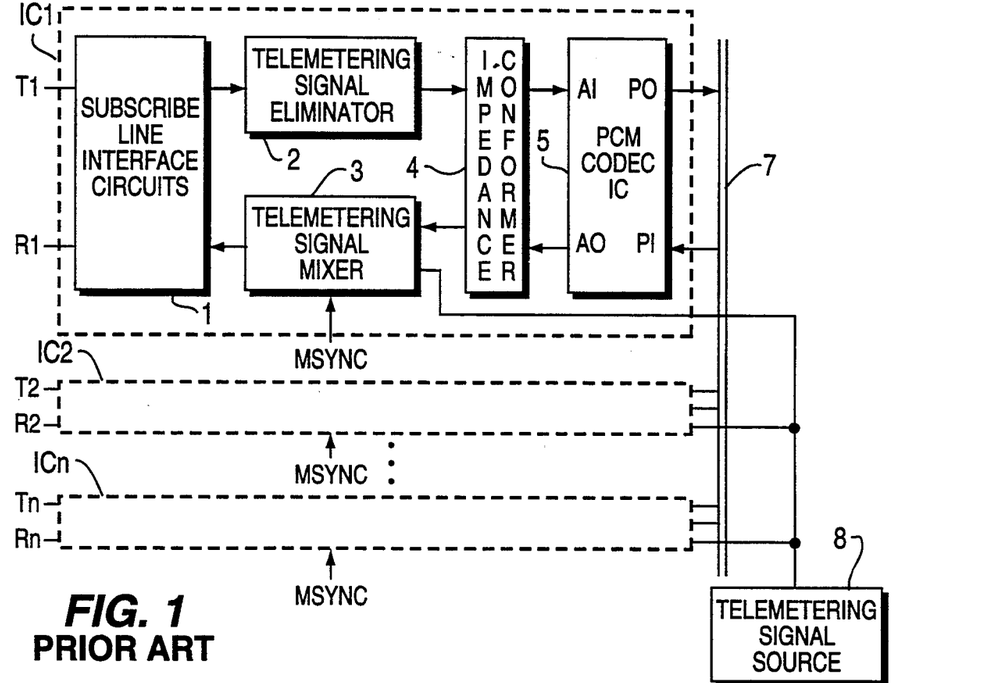
FIG. 1 is a block diagram of a conventional PCM electronic switching system comprising a plurality of PCM subscriber lines, each employing a conventional integrated PCM-CODEC circuit.
Figure 2:
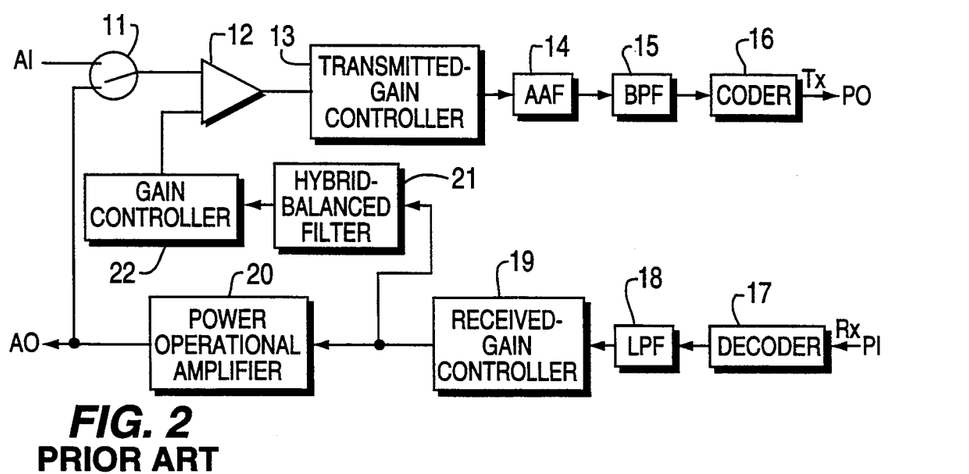
FIG. 2 is a detailed block diagram of the conventional integrated PCM-CODEC circuit.

The general feature of a conventional PCM electronic switching system, as shown in FIG. 1, consists of a plurality of subscriber lines (IC1-ICn), each of the subscriber lines including, SLIC (subscribe line interface circuits) 1, a telemetering signal eliminator 2, a telemetering signal mixer 3, an impedance conformer 4 and an integrated PCM-CODEC circuit 5 connected with a telemetering signal source 8 and a common bus 7 called a PCM highway whereby, a signal which is mixed with a telemetering signal in accordance with a synchronizing signal MSYNC from the telemetering signal source 8, is applied to the input of the SLIC 1 when call charge is counted up. And the integrated PCM-CODEC circuit 5, as shown in FIG. 2, includes a selector 11, a mixer 12, an transmitted-gain controller 13, an anti-aliasing filter (AAF) 14, a band pass filter (BPF) 15, a coder 16, a decoder 17, a low pass filter (LPF) 18, a received-gain controller 19, a power operational amplifier 20, a hybrid-balanced filter 21 and a gain controller 22.

Figure 3:
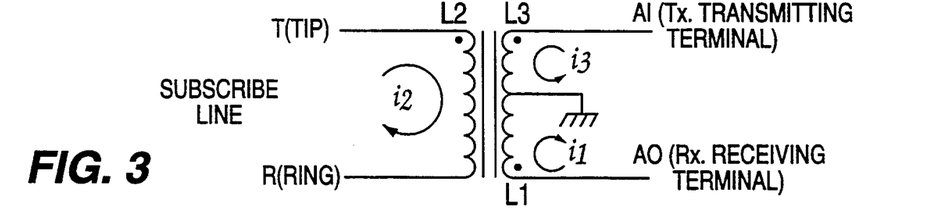
FIG. 3 is an equivalent circuit diagram illustrating the 2/4-wire transforming mechanism in an interfacer as a subscribed line matching means.

In the conventional PCM system, the call charge is counted up by reversing the voltage of a battery between a tip T1 and a ring R1. In this case, unwanted clicking sound is generated. At this time, a sine wave of a frequency of 12 KHz or 16 KHz without a voltage reversal is used in order to remove the clicking sound. The telemetering signal (sine wave) of the frequency of 12 KHz or 16 KHz is mixed with a voice band signal; and then the mixed signal is transmitted to the tip T1 and the ring R1. But the problem is that if the mixed signal is coupled to the transmission path, the transmitter signal, as a result, will be modulated and distorted because the coupled signal is too large for processing. Accordingly, the coupled signal must be removed at the transmitting party. Considering in more detail therewith, as shown in FIG. 3, the current i1 flowing through the coil L1 is generated by a signal from the receiving terminal Rx, the terminal A0 of the integrated PCM-CODEC circuit 5, by means of a hybrid 2/4 converter. Thus, the secondary induced current i2 appears on the coil L2 coupled with a subscriber line, inducing a current i3 to flow through on the coil L3 coupled to the transmitting terminal Tx and, as a result, unwanted telemetering signal is applied to the transmitter terminal AI. Such results in that, in the conventional integrated PCM-CODEC circuit 5, the signal which is outputted from the terminal A0 whose frequency is lied on the voice frequency band is only compensated as the signal having the different polarity from the polarity of the induced current i3 which is coupled to transmitting terminal Tx by the hybrid-balanced filter 21, and the gain controller 22.

The conventional integrated PCM-CODEC circuit 5 can not eliminate a telemetering signal which is coupled from a receiving path. Consequently, additional circuit components are required for example, the telemetering signal eliminator 2 must be built around the transmission path of the integrated PCM CODEC circuit 5. In the operation of the conventional PCM system having the telemetering eliminator 2 and signal the mixer 3, the PCM-CODEC circuit 5 converts all input signals, containing even noise, into a PCM signal i.e., a pulse-code-modulation signal) in a tone frequency band. The coupled mixed signal (echo signal) from the receiving terminal Rx is evaluated to a value of the current i3 at the transmitting terminal Tx through the hybrid-balanced filter 21 and then mixed with a gain controlled signal of the gain controller 22 by the mixer 12, which results in reducing the weight of the unwanted mixed signal with the telemetering signal from the receiving terminal Rx to the transmitting Tx and enabling the applied-gain controller to adjust the variation of gain made through the telemetering signal eliminator 2 and the impedance conformer 4 as shown in FIG. 1. Sampling operation results in the replication of the spectrum of the tone signal, and (unless Nyquist's criterion is satisfied) introduces aliasing distortion which is removed by the anti-aliasing filter 14. After removing around the sampling frequency, the tone frequency signal is sampled and converted into the PCM signal through the coder 16 and then the PCM signal is transferred to the PCM highway of a common bus 7. If a telemetering signal eliminating means is not included in the PCM system, the voltage level of a signal of the telemetering signal source 8, in general, becomes more than several volts because the telemetering signal has high distortion rate in a public telephone network due to a well-known characteristic of the subscriber line and resultingly the telemetering signal induced on the transmitting terminal Tx has the voltage level of several hundred millivolts greater than that of a tone signal. And so the modulated and distorted tone signal appears in the integrated PCM-CODEC circuit 5. For this reason, it is very essential for the PCM system to employ the telemetering signal eliminator 2.

However, requirement of additional circuit elements, such as the telemetering signal eliminator 2, around the integrated PCM-CODEC circuit 5 makes the peripheral arrangement of the PCM system even more complicated. Because of the complexity of the peripheral arrangement and the increase of the number of subscriber lines on a unit board of a subscriber, the wiring of the unit board in the PCM system has been extremely difficult which often results in, a falling out in quality of the products.

SUMMARY OF THE INVENTION

It, therefore, is an object of this invention to provide an integrated PCM-CODEC circuit employing a telemetering signal eliminator for removing a transmitting signal incurred by the telemetering signal that does not have to be heard by a transmitting party and a receiving party while they are talking over a public telephone.

Figure 4:
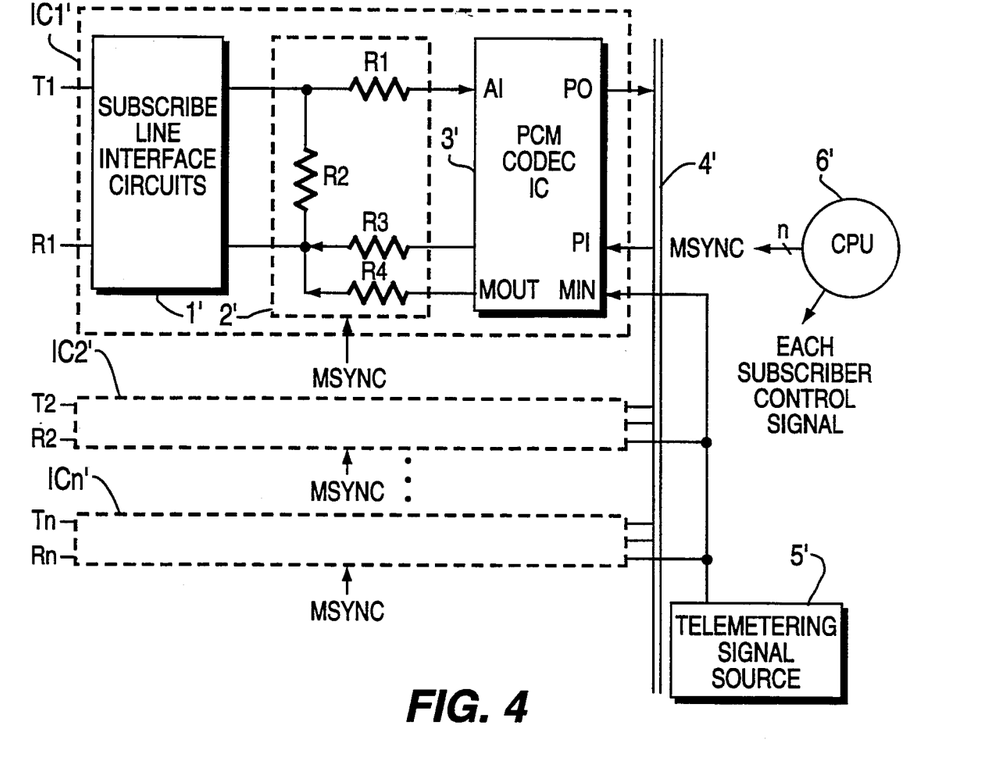
FIG. 4 is an embodiment of PCM signal processing in an electronic switching system employing an integrated PCM-CODEC circuit according to the present invention.
Figure 5:
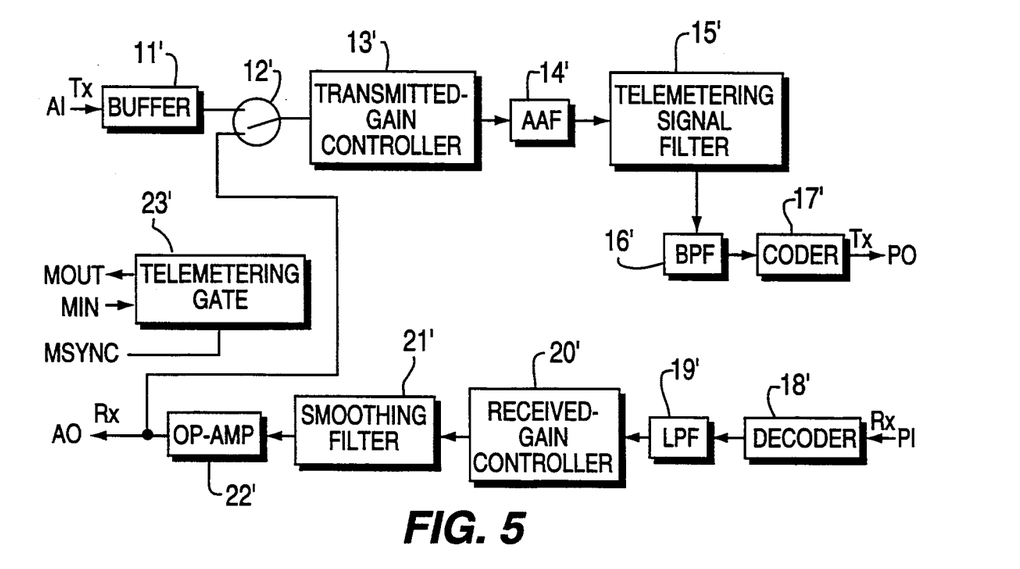
FIG. 5 is a detailed block diagram of the integrated PCM-CODEC circuit according to the present invention.

According to the one feature of the invention, the integrated PCM-CODEC circuit at least comprises a filter used to remove the telemetering signals at a transmitting party. The integrated PCM-CODEC circuit comprises a plurality of subscribers lines $IC_1$-$IC_n$ consisting of a SLIC subscriber line interface circuits 1' interfacing a telephone line with a switching system, an impedance conformer 4 and a PCM-CODEC 3', a common bus 4' called a PCM highway wherewith a telephone signal is transferred into or from a subscriber according to the time division rule for the timing of a telephone line, a telemetering signal source 5' and a CPU central processing unit 6' which controls to enable or disable the telephone call dialed by the n'th subscriber. The PCM-CODEC 3' comprises a buffer 11' for allowing high input impedance, a signal selector 12' used as an analog loopback for checking trouble from the receive to transmit PCM highway, a transmitted-loss controller 13' for compensating a gain generated from where a circuit is constructed in accordance with the protocol conformed to the subscriber line and compensating a gain or loss between the SLIC 1' and CODEC, an anti-aliasing filter 14' for preventing a replication of the spectrum followed in sequential steps from being affected by noise, a telemetering signal filter 15' for echo cancellation around sampling frequency band of the telemetering signal, a BPF 16' for filtering only a signal whose frequencies located in the voice frequency band from 300 Hz to 3.3 KHz with integral sinx/x correction, a coder 17' for converting an analog signal to a PCM output signal, a decoder 18' for converting a PCM input signal to an analog signal, a LPF 19' for filtering only a signal whose frequency is located in the tone frequency band from 0 Hz to 3.3 KHz with integral sinx/x correction, a received-gain controller 20' for compensating a gain generated from where a circuit is constructed in accordance with the protocol conformed to the SLIC and CODEC, a smoothing filter 21' for attenuating step-pulse components of a high frequency signal generated from where the LPF is operated with a switched capacitor therein, an operational amplifier 22' for amplifying a signal enough to drive the subscriber line, and a telemetering gate for switching the supply of the telemetering source signal.

Above-mentioned and other feature and objects of the present invention will become more apparent by reference to the following description taken in conjunction with the accompanying drawings.

DETAILED DESCRIPTION OF THE INVENTION

FIG. 4 shows an electronic switching system employing an integrated PCM-CODEC circuit according to the present invention. FIG. 5 shows a block diagram of the integrated PCM-CODEC circuit of the present invention. Referring to FIG. 5, a calling tone signal induces the current i2 upon the subscriber line, as shown in FIG. 3, and causes the current i3 to be generated at the transmitting terminal Tx. A signal taken along with the induced current i3 is applied to the terminal AI of the PCM-CODEC 3'. The signal applied to the terminal AI includes a tone signal from the sides of the tip T and the ring R, a power noise from a power source of the system, a white noise generated prior to the signal's arrival to the terminal AI, an induced component (a tone frequency band and telemetering signal) at the receiving terminal Rx appears through the path of i1-i2-i3. The PCM-CODEC 3' converts only a necessary signal, among all signals, whose frequency is located in the tone band to a PCM signal, that is, a digital signal. A signal applied to the PCM-CODEC 3' goes to the transmitted-gain controller 13' through the buffer 11' and the signal selector 12'. And then the transmitted-gain controller 13' compensates the gain of the input signal to conform it with the protocol of the subscriber line and compensating for gain or loss between the SLIC and the CODEC, and thereby passing the conformed signal through the anti-aliasing filter 14', the telemetering signal filter 15' and BPF 16' in order to remove the signal out of a voice frequency band. In the interim, the anti-aliasing filter 14' eliminates the aliasing effect which occurred while sampling in the next stages with the eliminator 15' and the BPF 16', and the BPF 16', by means of a sampling circuit, removes the appearance of the aliasing between a voice signal frequency and around sampling frequency band, and the telemetering signal filter 15' eliminates an echo in a telemetering signal.

Therefore, a resultant signal, being passed through the BPF 16', with the frequency from 300 Hz to 3.3 KHz in the voice frequency band is converted to the PCM signal (or the digital signal) and then transferred to the other subscriber party through the common bus 4' of the PCM highway. On the other hand, the PCM signal inputted at the receiving terminal Rx is converted into an analog signal by the decoder 18' and applied to the LPF 19'. In the LPF 19' only a signal with the frequency from 0 Hz to 3.3 KHz in the voice band is outputted and applied to the received-gain controller 20'. The received-gain controller 20' compensates previously the gain of the output signal from the LPF 19' as much as the loss itself after considering the characteristics of the impedance conformer 2. Such gain-controlled signal contains step-pulse components of high frequency obtained at the LPF 19' which consists of the switched capacitor. So, after damping the step-pulse components in the signal by means of the smoothing filter 21', the resultant signal without the step pulses is amplified by the operational amplifier 22' directly to activate the subscriber line and then transferred to the subscriber line through the impedance conformer 2' and the SLIC 1'. The telemetering gate 23' enables a signal for telemetering process and a voice band signal in need of being applied to a subscriber line to be transferred, by means of a resistor, as a mixed signal, connecting or disconnecting to the telemetering signal source 5', by the control of the MSYNC from telemetering source, at a given time, thus minimizing a topology of the architecture for incoming line of the telephone network.

Figure 6A:
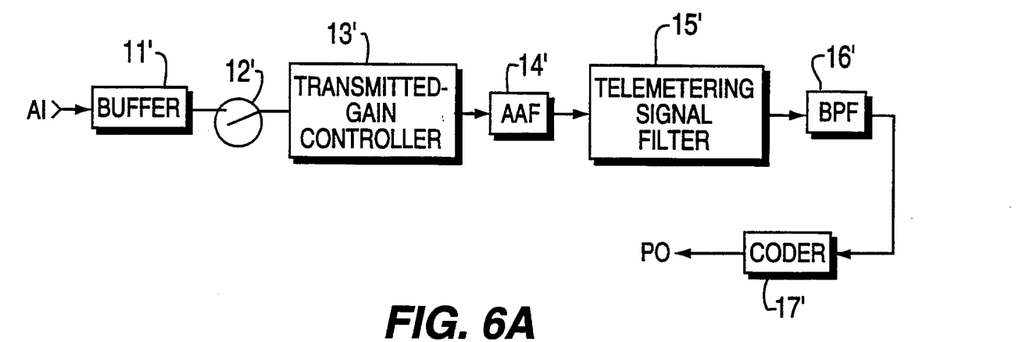
FIGS. 6A and 6B show different embodiment of the integrated PCM-CODEC circuit according to the present invention.
Figure 6B:
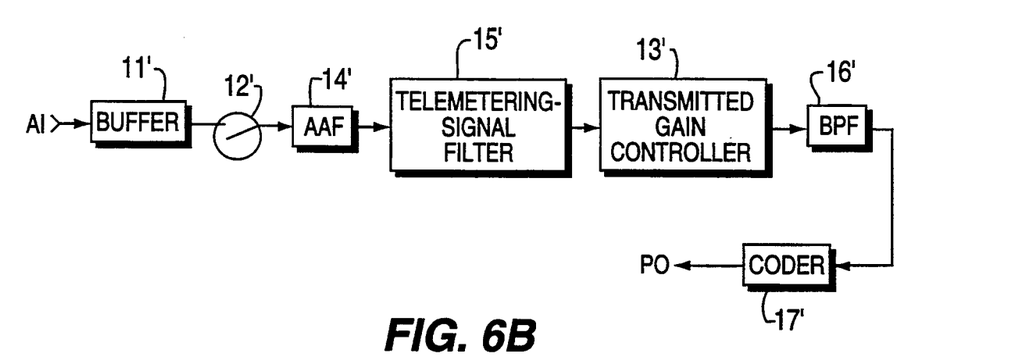
Figure 6C:
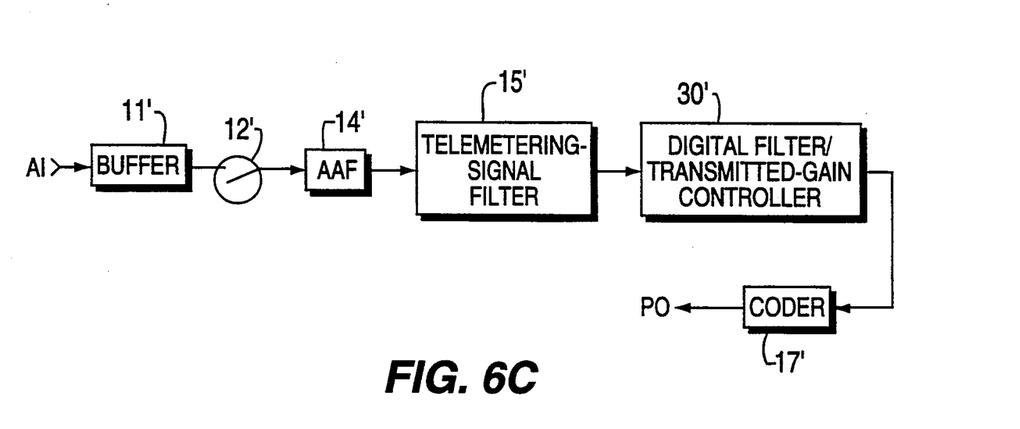

FIGS. 6A, 6B and 6C show different embodiments of the integrated PCM-CODEC circuit according to the present invention. In the FIGS. 6A and 6B, although the circuit arrangement between the signal selector 12' and the coder 17' in the PCM-CODEC 3' is different from that of FIG. 5, all the circuit elements operate in the same way in order to eliminate coupled telemetering signal. The feature disclosed in FIG. 6C, wherein a single digital filter filter/transmitted-gain controller 30 plays the role of performing the operation accomplished with the transmitted-gain controller 13', the anti-aliasing filter 14' and the BPF 16' shown in FIG. 5 is offered to provide the same effect as the integrated PCM-CODEC circuit 3' shown in FIG. 5. In conventional processing methods with an analog and a digital signal, the BPF 16' and the coder 17' have employed a SCF (switched capacitor filter) for the analog signal and a SDM (sigma-deltamodulator) for the digital signal. In contradistinction, the present invention can utilize two methods in order to reduce the white noise to the level of ½ or ¼ times thereof; the first method being that a sampling clock is adapted to activate the telemetering filter 15' and the BPF 16'; the second method being that the operating frequency of the telemetering filter 15' is increased by two or four times thereof. As described above, the present invention can remove telemetering signals that do not distort a voice band frequency of transmitting party, by comprising at least a filter in the integrated PCM-CODEC circuit without adding circuit elements constructed around the integrated PCM-CODEC circuit.

Furthermore, it reduces the noise generated by the modulation and the distorted signal caused by a telemetering signal, whereby the counterpart's voice can be heard more clear than before and more lines on a unit board for a subscriber can be made available.

What is claimed is:

1. An integrated pulse-code-modulation coder-decoder circuit of an electronic switching system comprising a plurality of subscriber lines comprising an interface circuit interfacing a telephone line with the electronic switching system, an impedance conformer and a common bus for transferring a telephone call from a first subscriber to a second subscriber, a telemetry source for generating a telemetering signal and a central processing unit for controlling operation of the telephone call, said integrated pulse-code-modulation coder-decoder circuit comprising:

buffer means for allowing high input impedance;

signal selector means having an analog loopback for checking trouble from a received signal through said buffer means to transmit a selected signal;

transmitted-gain controller means for generating a first gain controlled signal by compensating said selected signal in accordance with a protocol conformed to the subscriber line;

anti-aliasing filter means for preventing alias of said first gain controlled signal;

telemetering filter means for removing echo components of the telemetering signal in a signal output from said anti-aliasing filter means;

band-pass filter means for filtering only a signal whose frequency is located in a first voice frequency band within 300 Hz to 3.3 KHz from a signal output from said telemetering filter means;

coder means for converting a signal output from said band-pass filter means into a PCM output signal via said common bus;

decoder means for converting a PCM input signal from said common bus into a decoded signal;

low-pass filter means for filtering only a signal whose frequency is located in a second voice frequency band within 0 Hz to 3.3 KHz from said decoded signal;

received-gain controller means for generating a second gain controlled signal by compensating a signal output from said low-pass filter means;

smoothing filter means for generating a smoothed signal by attenuating step-pulse components of said second gain controlled signal;

operational amplifier means for amplifying said smoothed signal to drive the subscriber line; and telemetering gate means for switching the supply of the telemetering signal output from said telemetry source.

2. The integrated pulse-code-modulation circuit as claimed in claim 1, wherein the telemetering signal is a sine-wave signal having a frequency in the range of 12 KHz–16 KHz.

3. The integrated pulse-code-modulation circuit as claimed in claim 1, wherein the telemetering filter means employs a switched capacitor filter for removing echo components of said telemetering signal.

4. The integrated pulse-code-modulation circuit as claimed in claim 3, wherein a frequency of a signal removed by the telemetering filter means is adaptable to be selected by an external control signal.

5. The integrated pulse-code-modulation circuit as claimed in claim 3, further comprised of a sampling clock adaptable to activate said telemetering filter means and said band-pass filter means.

6. The integrated pulse-code-modulation circuit as claimed in claim 1, wherein the transmitted-gain controller means is connected to the buffer means through the signal selector means, the telemetering filter means is connected to the transmitted-gain controller means through the anti-aliasing filter means and the coder means is connected to the telemetering filter means through the band-pass filter means.

7. The integrated pulse-code-modulation circuit as claimed in claim 6, wherein the transmitted-gain controller means is coupled between the telemetering filter means and the band-pass filter means to compensate said selected signal in accordance with the protocol conformed to the subscriber line.

8. The integrated pulse-code-modulation circuit as claimed in claim 6, further comprising digital filter/transmitted-gain controller means coupled between the telemetering filter means and the coder means, for controlling the gain and filtration of the signal output from said telemetering filter means.

9. An electronic switching system comprising a subscriber line interface circuit interfacing with a subscriber's telephone line, a coder-decoder integrated circuit interfacing with a common bus for transferring a telephone call from a first subscriber to a second subscriber, an impedance conformer interposed between the subscriber line interface circuit and the coder-decoder integrated circuit, a telemetry source generating a telemetering signal for metering communication condition of each subscriber, and a processor for controlling operation of each telephone call and generation of the telemetering signal, said coder-decoder integrated circuit comprising:

means for temporarily retaining voice signals within a voice frequency band received from the first subscriber through the first subscriber's telephone line of said subscriber line interface circuit via said impedance conformer, and providing buffered voice signals;

selector means for providing selected voice signals upon selection of one of said buffered voice signals and return voice signals;

first means for providing first filtered voice signals by controlling gain of said selected voice signals and filtering said selected voice signals to attenuate aliasing, interference of said telemetering signal and frequencies outside of said voice frequency band;

coder means connected to said common bus, for providing encoded voice data by encoding said first filtered voice signals and transferring said encoded voice data to the second subscriber via said common bus;

decoder means connected to said common bus, for providing decoded voice signals by decoding return voice data received from said second subscriber via said common bus;

second means for providing second filtered voice signals by low-pass filtering, gain controlling and attenuating said decoded voice signals; and amplifier means for providing said return voice signals to said first subscriber through the first subscriber's telephone line of said subscriber line interface circuit via said impedance conformer, and to said selector means in dependence upon said second filtered voice signals.

10. The coder-decoder integrated circuit as claimed in claim 9, wherein said first means comprises:

gain controller means coupled to receive said selected voice signals, for providing gain-controlled voice signals by compensating for transmission loss from said selected voice signals;

anti-aliasing filter means connected to said gain controller means, for providing third filtered voice signals by filtering said gain-controlled voice signals to remove peripheral sampling frequencies;

telemetering filter means connected to said anti-aliasing filter means, for providing fourth filtered voice signals by filtering said third filtered voice signals to attenuate echoes of the telemetering signal; and band-pass filter means connected to said telemetering filter means, for providing said first filtered voice signals by passing only components of said fourth filtered voice signals within said voice frequency band of 300 Hz–3.3 KHz.

11. The coder-decoder integrated circuit as claimed in claim 9, wherein said first means comprises:

anti-aliasing filter means coupled to receive said selected voice signals, for providing third filtered voice signals by filtering said selected voice signals to remove peripheral sampling frequencies;

telemetering filter means connected to said anti-aliasing filter means, for providing fourth filtered voice signals by filtering said third filtered voice signals to attenuate echoes of the telemetering signal;

gain controller means connected to said telemetering filter means, for providing gain-controlled voice signals by compensating for transmission loss of amplitude from said fourth filtered voice signals; and band-pass filter means connected to said gain controller means, for providing said first filtered voice signals by passing only components of said gain-controlled voice signals within said voice frequency band of 300 Hz–3.3 KHz.

12. The coder-decoder integrated circuit as claimed in claim 9, wherein said first means comprises:

anti-aliasing filter means coupled to receive said selected voice signals, for providing third filtered voice signals by filtering said selected voice signals to remove peripheral sampling frequencies;

telemetering filter means connected to said anti-aliasing filter means, for providing fourth filtered voice signals by filtering said third filtered voice signals to eliminate echo of the telemetering signal;

digital filter/gain-controller means connected to said telemetering filter means, for providing said first filtered voice signals by compensating for transmission loss from said fourth filtered voice signals and passing only components of said fourth filtered voice signals within said voice frequency band of 300 Hz–3.3 KHz.

13. The coder-decoder integrated circuit as claimed in claim 10, wherein said telemetering filter means is a switched capacitor filter coupled to said anti-aliasing filter means, for removing echo components of said telemetering signal.

14. The coder-decoder integrated circuit as claimed in claim 11, wherein said telemetering filter means is a switched capacitor filter coupled to said anti-aliasing means, for removing echo components of said telemetering signal.

15. The coder-decoder integrated circuit as claimed in claim 12, wherein said telemetering filter means is a switched capacitor filter coupled to said anti-aliasing means, for removing echo components of said telemetering signal.

16. The coder-decoder integrated circuit as claimed in claim 9, wherein said second means comprises:

low-pass filter means coupled to receive said decoded voice signals from said common bus, for passing only components of said decoded voice signals within the voice frequency band of 0–3.3 KHz;

gain-controller means for controlling gain of said components of said decoded voice signals within the voice frequency band of 0–33 KHz to compensate for transmission loss from said decoded voice signals; and smoothing filter means for providing said second filtered voice signals by smoothing and attenuating an output of said gain-controller means.

17. A pulse-code-modulation coder-decoder integrated circuit for a subscriber line in an electronic switching system providing encoding and decoding of voice signals representative of a telephone call between a first subscriber to a second subscriber via a subscriber line interface circuit within said electronic switching system to remove telemetering sound from the voice signals, said pulse-code-modulation coder-decoder comprising:

means for temporarily retaining voice signals representative of a telephone call received from the first subscriber through a subscriber's telephone line via said subscriber line interface circuit, and providing buffered voice signals;

selector means for providing selected voice signals upon selection of one of said buffered voice signals and return voice signals;

first means for providing first filtered voice signals by controlling the gain of said selected voice signals and filtering said selected voice signals to attenuate aliasing, interference of said telemetering sound and frequencies outside of a voice frequency band;

coder means connected to a common bus enabling communication between subscribers within said electronic switching system, for providing pulse-code-modulated voice data by encoding said first filtered voice signals and transferring said pulse-code-modulated voice data to the second subscriber via said common bus;

decoder means connected to said common bus, for providing decoded voice signals by decoding pulse-code-demodulated voice data received from said second subscriber via said common bus;

second means for providing second filtered voice signals by low-pass filtering, gain controlling and attenuating said decoded voice signals; and amplifier means for providing said return voice signals to said first subscriber through the first subscriber's telephone line via said subscriber line interface circuit, and to said selector means in dependence upon said second filtered voice signals.

18. The pulse-code-modulation coder-decoder integrated circuit as claimed in claim 17, wherein said first means comprises:

gain controller means coupled to receive said selected voice signals, for providing gain-controlled voice signals by compensating for transmission loss from said selected voice signals;

anti-aliasing filter means connected to said gain controller means, for providing third filtered voice signals by filtering said gain-controlled voice signals to remove peripheral sampling frequencies;

telemetering filter means connected to said anti-aliasing filter means, for providing fourth filtered voice signals by filtering said third filtered voice signals to eliminate echo of the telemetering sound; and band-pass filter means connected to said telemetering filter means, for providing said first filtered voice signals by passing only components of said fourth filtered voice signals within said voice frequency band of 300 Hz–3.3 KHz.

19. The pulse-code-modulation coder-decoder integrated circuit as claimed in claim 17, wherein said first means comprises:

anti-aliasing filter means coupled to receive said selected voice signals, for providing third filtered voice signals by filtering said selected voice signals to remove peripheral sampling frequencies;

telemetering filter means connected to said anti-aliasing filter means, for providing fourth filtered voice signals by filtering said third filtered voice signals to eliminate echo of the telemetering sound;

gain controller means connected to said telemetering filter means, for providing gain-controlled voice signals by compensating for transmission loss of amplitude from said fourth filtered voice signals; and band-pass filter means connected to said gain controller means, for providing said first filtered voice signals by passing only components of said gain-controlled voice signals only within said voice frequency band of 300 Hz–3.3 KHz.

20. The pulse-code-modulation coder-decoder integrated circuit as claimed in claim 17, wherein said first means comprises:

anti-aliasing filter means coupled to receive said selected voice signals, for providing third filtered voice signals by filtering said selected voice signals to remove peripheral sampling frequencies;

telemetering filter means connected to said anti-aliasing filter means, for providing fourth filtered voice signals by filtering said third filtered voice signals to eliminate echo of the telemetering sound;

digital filter/gain-controller means connected to said telemetering filter means, for providing said first filtered voice signals by compensating for transmission loss of amplitude from said fourth filtered voice signals and passing only components of said fourth filtered voice signals within said voice frequency band of 300 Hz–3.3 KHz.

21. The pulse-code-modulation coder-decoder integrated circuit as claimed in claim 17, wherein said telemetering filter means is a switched capacitor filter coupled to remove echo components of said telemetering sound.

22. The pulse-code-modulation coder-decoder integrated circuit as claimed in claim 17, wherein said second means comprises:

low-pass filter means coupled to receive said decoded voice signals from said common bus, for passing only components of said decoded voice signals within the voice frequency band of 0–3.3 KHz;

gain-controller means for providing gain-controlled voice signals by gain controlling said components of said decoded voice signal within the voice frequency band passed through said low-pass filter means to compensate for transmission loss of amplitude from said decoded voice signals; and smoothing filter means for providing said second filtered voice signals by smoothing and attenuating said gain-controlled voice signals.

23. A method for encoding and decoding of voice signals representative of a telephone call between a first subscriber to a second subscriber from a common bus to an individual subscriber's telephone line within an electronic switching system to remove telemetering sound from the voice signals, said method comprising the steps of:

receiving said voice signals within a voice frequency band from the first subscriber through the individual subscriber's telephone line;

providing selected voice signals upon selection of one of said voice signals received from said first subscriber and return voice signals;

controlling the gain of said selected voice signals to generate gain-controlled voice signals;

generating first filtered voice signals by filtering said gain-controlled voice signals to remove peripheral sampling frequencies;

generating second filtered voice signals by filtering said first filtered voice signals to eliminate echo of the telemetering sound;

generating third filtered voice signals by band-pass filtering said second filtered voice signals within said voice frequency band;

providing pulse-code-modulated voice data by encoding said third filtered voice signals and transferring said pulse-coded-modulated voice data to the second subscriber via said common bus;

generating decoded voice signals by decoding pulse-code-demodulated voice data received from said second subscriber via said common bus;

generating fourth filtered voice signals by low-pass filtering, gain controlling and attenuating said decoded voice signals; and providing said return voice signals to said first subscriber through the individual subscriber's telephone line in dependence upon said fourth filtered voice signals.

24. The method as claimed in claim 23, wherein said step of generating said fourth filtered voice signals further comprises:

receiving said decoded voice signals from said common bus, for passing only components of said decoded voice signals within the voice frequency band of 0–3.3 KHz;

providing second gain-controlled voice signals by gain controlling said components of said decoded voice signal within the voice frequency band to compensate for transmission loss of amplitude from said decoded voice signals; and providing said fourth filtered voice signals by smoothing and attenuating said gain-controlled voice signals.

25. The method as claimed in claim 23, wherein said voice frequency band is 300 Hz–3.3 KHz.

* * * * *

UNITED STATES PATENT AND TRADEMARK OFFICE
CERTIFICATE OF CORRECTION

PATENT NO. : 5,341,417
DATED : 23 August 1994
INVENTOR(S) : In-Hwan Hwang

It is certified that error appears in the above-indentified patent and that said Letters Patent is hereby corrected as shown below:

Column 2,

Line 6,    after "telemetering", insert --signal--, and               after "and", delete "signal";

Column 5,

Line 5,    delete "filter" the second occurrence;

Signed and Sealed this

Ninth Day of April, 1996

Attest:

BRUCE LEHMAN

*Attesting Officer*    *Commissioner of Patents and Trademarks*